(12) United States Patent
Lee et al.

(10) Patent No.: US 10,556,564 B2
(45) Date of Patent: Feb. 11, 2020

(54) ROOF AIRBAG APPARATUS

(71) Applicant: Hyundai Mobis Co., Ltd., Seoul (KR)

(72) Inventors: Seok Min Lee, Yongin-si (KR); Byung Ho Min, Seoul (KR); Hae Kwon Park, Yongin-si (KR); Kyu Sang Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 186 days.

(21) Appl. No.: 15/838,330

(22) Filed: Dec. 11, 2017

(65) Prior Publication Data

US 2018/0162315 A1 Jun. 14, 2018

(30) Foreign Application Priority Data

Dec. 12, 2016 (KR) .................. 10-2016-0168992

(51) Int. Cl.
*B60R 21/214* (2011.01)
*B60R 21/2346* (2011.01)
*B60R 21/233* (2006.01)
*B60R 21/231* (2011.01)

(52) U.S. Cl.
CPC .......... *B60R 21/214* (2013.01); *B60R 21/231* (2013.01); *B60R 21/233* (2013.01); *B60R 21/2346* (2013.01); *B60R 2021/23192* (2013.01); *B60R 2021/23316* (2013.01)

(58) Field of Classification Search
CPC ... B60R 21/262; B60R 21/231; B60R 21/233; B60R 21/213; B60R 21/214; B60R 21/2346; B60R 2021/23192; B60R 2021/2612; B60R 2021/2615; B60R 2021/2617; B60J 7/0007; B60J 7/0015; B60J 7/0023

See application file for complete search history.

(56) References Cited

U.S. PATENT DOCUMENTS

| 6,070,902 | A | 6/2000 | Kowalski et al. |
| 6,189,960 | B1 * | 2/2001 | Mumura ................. B60J 7/0015 160/7 |
| 6,749,216 | B2 * | 6/2004 | Tanase ................... B60R 21/232 280/730.2 |
| 6,783,174 | B2 | 8/2004 | Bohm et al. |
| 6,817,626 | B2 | 11/2004 | Boll et al. |

(Continued)

FOREIGN PATENT DOCUMENTS

| DE | 100 39 803 A1 * | 2/2002 |
| KR | 10-2003-0063738 | 7/2003 |
| KR | 10-1509771 | 4/2015 |

OTHER PUBLICATIONS

Non-Final Office Action dated May 17, 2019, issued in U.S. Appl. No. 15/838,174.

(Continued)

*Primary Examiner* — Ruth Ilan
(74) *Attorney, Agent, or Firm* — H.C. Park & Associates, PLC

(57) ABSTRACT

A roof airbag apparatus includes a roof airbag cushion disposed in a folded state in a panorama roof and configured to inflate and deploy as gas is supplied from an inflator; and a diffuser disposed in the roof airbag cushion and configured to guide a deployment of the roof airbag cushion in a width direction of a vehicle when the roof airbag cushion is inflated.

11 Claims, 7 Drawing Sheets

(56) References Cited

U.S. PATENT DOCUMENTS

| | | |
|---|---|---|
| 7,712,773 B2 | 5/2010 | Walston |
| 8,459,696 B2 | 6/2013 | Browne et al. |
| 9,067,562 B2 | 6/2015 | Nakashima |
| 9,156,427 B2 | 10/2015 | Wang et al. |
| 9,771,048 B2 | 9/2017 | Min et al. |
| 2001/0017459 A1 | 8/2001 | Fischer |
| 2002/0074775 A1* | 6/2002 | Ryan ................ B60R 21/2346 280/728.2 |
| 2002/0074778 A1 | 6/2002 | Melia |
| 2002/0125690 A1* | 9/2002 | Boll .................... B60R 21/213 280/730.1 |
| 2003/0168835 A1 | 9/2003 | Thomas et al. |
| 2004/0066022 A1 | 4/2004 | Mori |
| 2005/0046159 A1 | 3/2005 | Noguchi et al. |
| 2005/0116450 A1 | 6/2005 | Noguchi |
| 2008/0012275 A1 | 1/2008 | Pinsenschaum et al. |
| 2008/0150263 A1* | 6/2008 | Mizuno ............... B60R 21/214 280/730.1 |
| 2011/0079990 A1 | 4/2011 | Cheal et al. |
| 2014/0203541 A1 | 7/2014 | Wei et al. |
| 2014/0217710 A1 | 8/2014 | Fukawatase et al. |
| 2015/0115581 A1 | 4/2015 | Mazanek et al. |
| 2016/0023626 A1 | 1/2016 | Hiruta et al. |
| 2016/0200281 A1 | 7/2016 | Takeshita et al. |
| 2016/0280178 A1 | 9/2016 | Kruse |
| 2017/0072896 A1 | 3/2017 | Fukawatase et al. |
| 2017/0088083 A1 | 3/2017 | Haraiwa et al. |
| 2018/0162313 A1* | 6/2018 | Lee ...................... B60R 21/213 |
| 2018/0162314 A1* | 6/2018 | Lee .................... B60R 21/2338 |
| 2018/0162315 A1 | 6/2018 | Lee et al. |
| 2018/0265029 A1* | 9/2018 | Min .................... B60R 21/233 |
| 2018/0312130 A1* | 11/2018 | Min .................... B60R 21/233 |
| 2018/0326939 A1 | 11/2018 | Jung et al. |
| 2019/0016292 A1* | 1/2019 | Son .................... B60R 21/233 |
| 2019/0111885 A1 | 4/2019 | Hwangbo et al. |
| 2019/0143928 A1 | 5/2019 | Raikar et al. |

OTHER PUBLICATIONS

Non-Final Office Action dated Jul. 11, 2019, issued in U.S. Appl. No. 15/838,260.

Notice of Allowance dated Sep. 18, 2019, issued in U.S. Appl. No. 15/838,174.

* cited by examiner

ROOF AIRBAG APPARATUS

CROSS-REFERENCE TO RELATED APPLICATION

This application claims priority from and the benefit of Korean Patent Application No. 10-2016-0168992, filed on Dec. 12, 2016, which is hereby incorporated by reference for all purposes as if set forth herein.

BACKGROUND

Field

Exemplary embodiments relate to a roof airbag apparatus, and more particularly, to a roof airbag apparatus capable of preventing both widthwise sides of a roof airbag cushion from being asymmetrically deployed at an initial deployment stage of the roof airbag cushion.

Discussion of the Background

In general, a vehicle carries occupants. An airbag apparatus is installed in the vehicle for the safety of a driver or a passenger. A roof airbag apparatus is installed on a panorama roof which is positioned on the roof of the vehicle. A roof airbag cushion is installed in a folded state on one side of a center pillar. The center pillar is installed to traverse the panorama roof in a width direction to suppress the panorama roof from being crumbled upon a rollover of the vehicle. The center pillar should be necessarily installed in accordance with safety regulations. Such a roof airbag apparatus is inflated and deployed upon a rollover of the vehicle and thereby prevents injury to or outward spilling of the driver or the passenger.

However, in the conventional art, since the diffuser of the roof airbag cushion is formed in an asymmetrical structure with respect to the width direction of the roof airbag cushion, gas is asymmetrically injected to both sides of the roof airbag cushion at an initial deployment stage of the roof airbag cushion. Therefore, since the roof airbag cushion is asymmetrically deployed to both sides at an initial deployment stage of the roof airbag cushion, there may be a case where the leading end of the roof airbag cushion is not deployed to the end portion of the panorama roof.

A background art of the present disclosure is disclosed in Korean Unexamined Patent Publication No. 2003-0063738 (published on Jul. 31, 2003 and entitled 'Roof airbag for automobile').

The above information disclosed in this Background section is only for enhancement of understanding of the background of the invention and, therefore, it may contain information that does not constitute prior art.

SUMMARY

Various embodiments are directed to a roof airbag apparatus capable of preventing both widthwise sides of a roof airbag cushion from being asymmetrically deployed at an initial deployment stage of the roof airbag cushion.

In an embodiment, a roof airbag apparatus may include: a roof airbag cushion disposed in a folded state in a panorama roof and configured to inflate and deploy as gas is supplied from an inflator; and a diffuser disposed in the roof airbag cushion and configured to guide a deployment of the roof airbag cushion in a width direction of a vehicle when the roof airbag cushion is inflated.

According to the embodiments, at an initial deployment stage of a roof airbag cushion, since a diffuser injects gas asymmetrically to both widthwise sides of the roof airbag cushion, both the widthwise sides of the roof airbag cushion may be deployed symmetrically. Therefore, because the roof airbag cushion is prevented from being asymmetrically inflated and deployed, it is possible to prevent the roof airbag cushion from being not deployed by being caught by a center pillar.

Moreover, according to the embodiments, when gas flows from a second chamber portion to a third chamber portion, the lengthwise deployment of a leading deployment part is temporarily stopped while the flow direction of gas is changed oppositely. Therefore, because the widthwise center portion of the leading deployment part is inflated after the leading end of the leading deployment part reaches the center pillar, it is possible to prevent the leading end of the leading deployment part from being not deployed by being caught by the center pillar.

Further, according to the embodiments, since a third seam portion limits the inflation thickness of a trailing deployment part, the third seam portion may contribute to reducing the gas accommodation amount of the roof airbag cushion. Therefore, the roof airbag cushion may be tightly inflated by gas.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
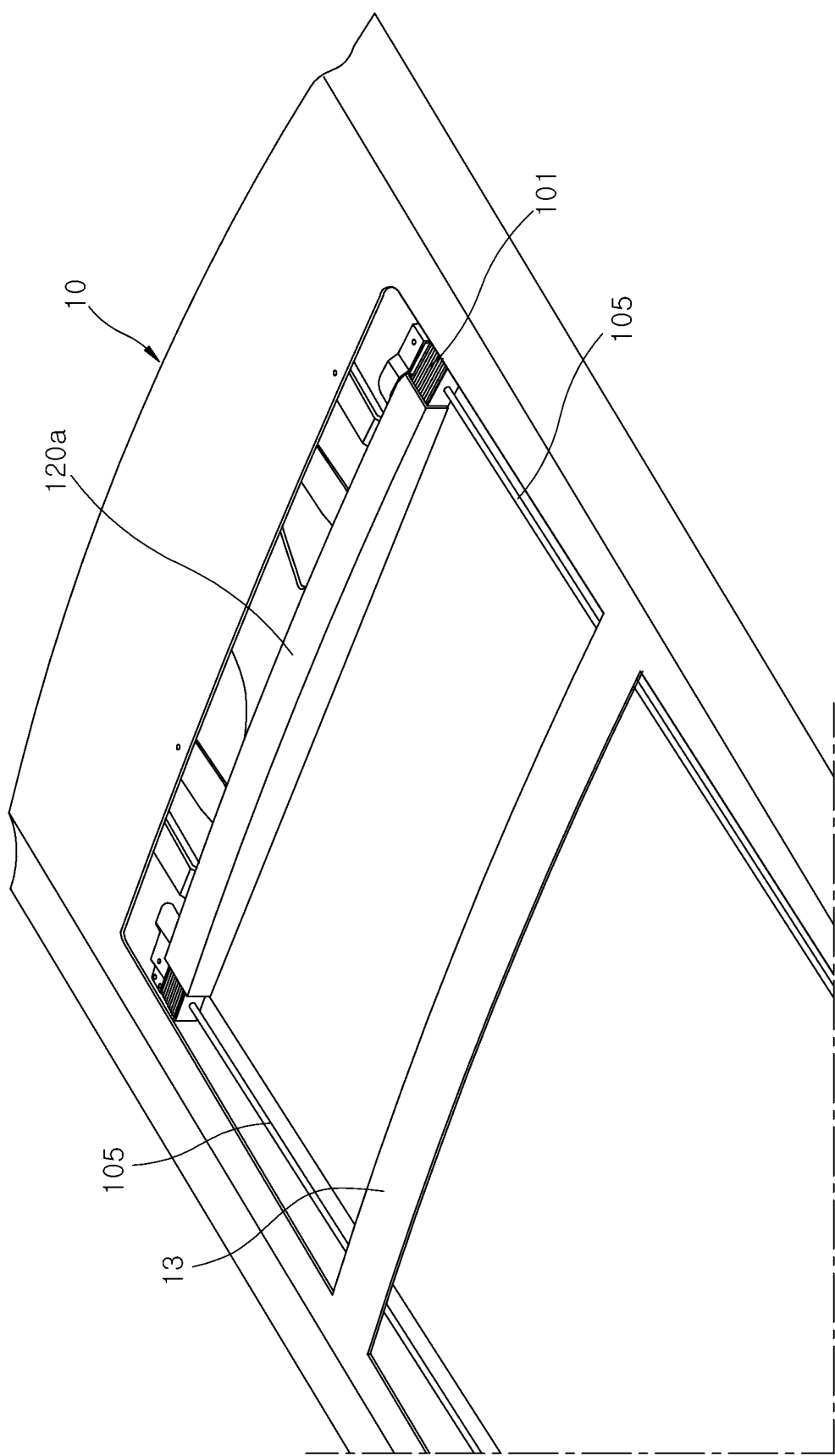
FIG. 1 is a perspective view illustrating a state in which a roof airbag apparatus in accordance with an embodiment of the present disclosure is installed on a panorama roof.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
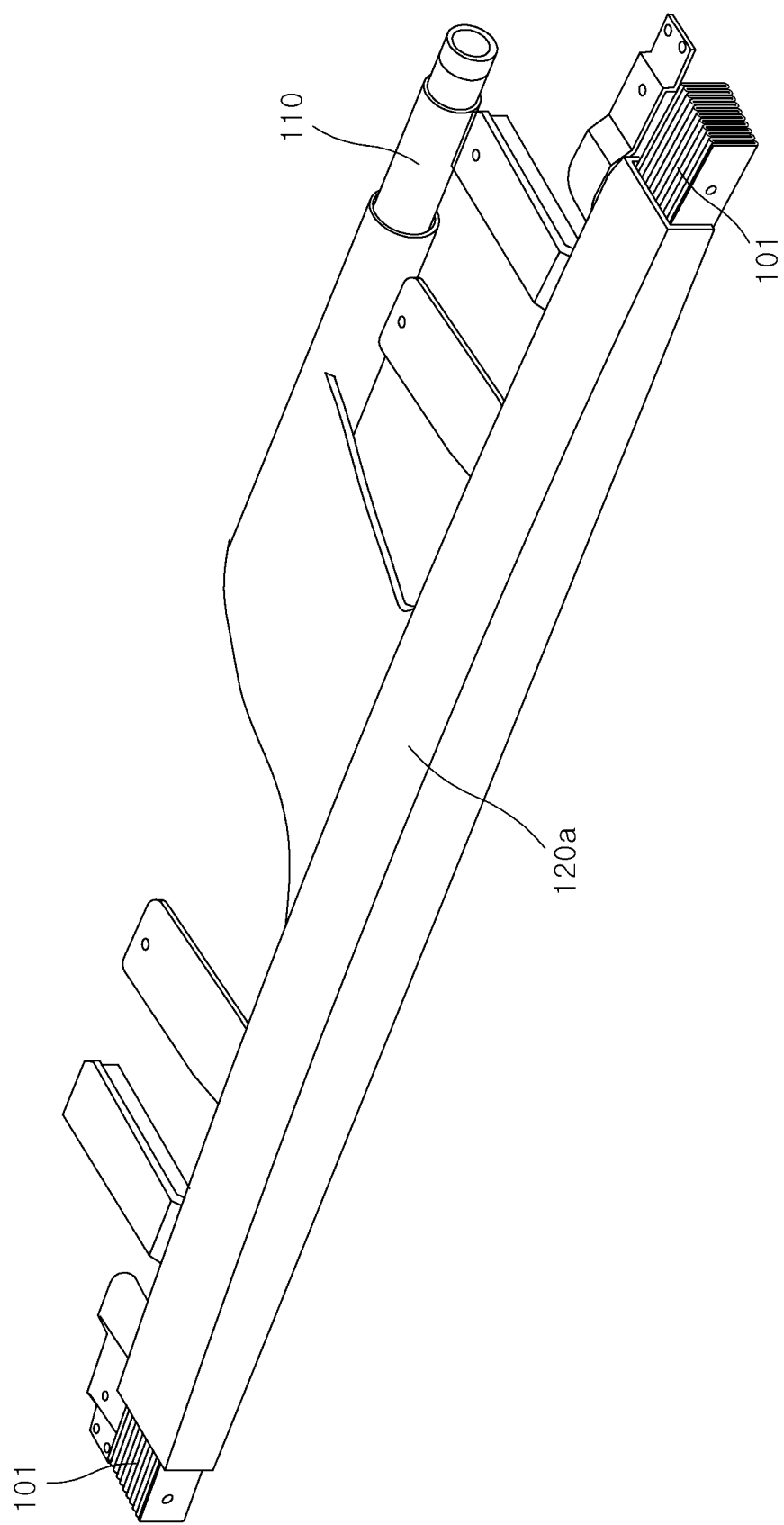
FIG. 2 is a perspective view illustrating the roof airbag apparatus in accordance with the embodiment of the present disclosure.
Figure 3:
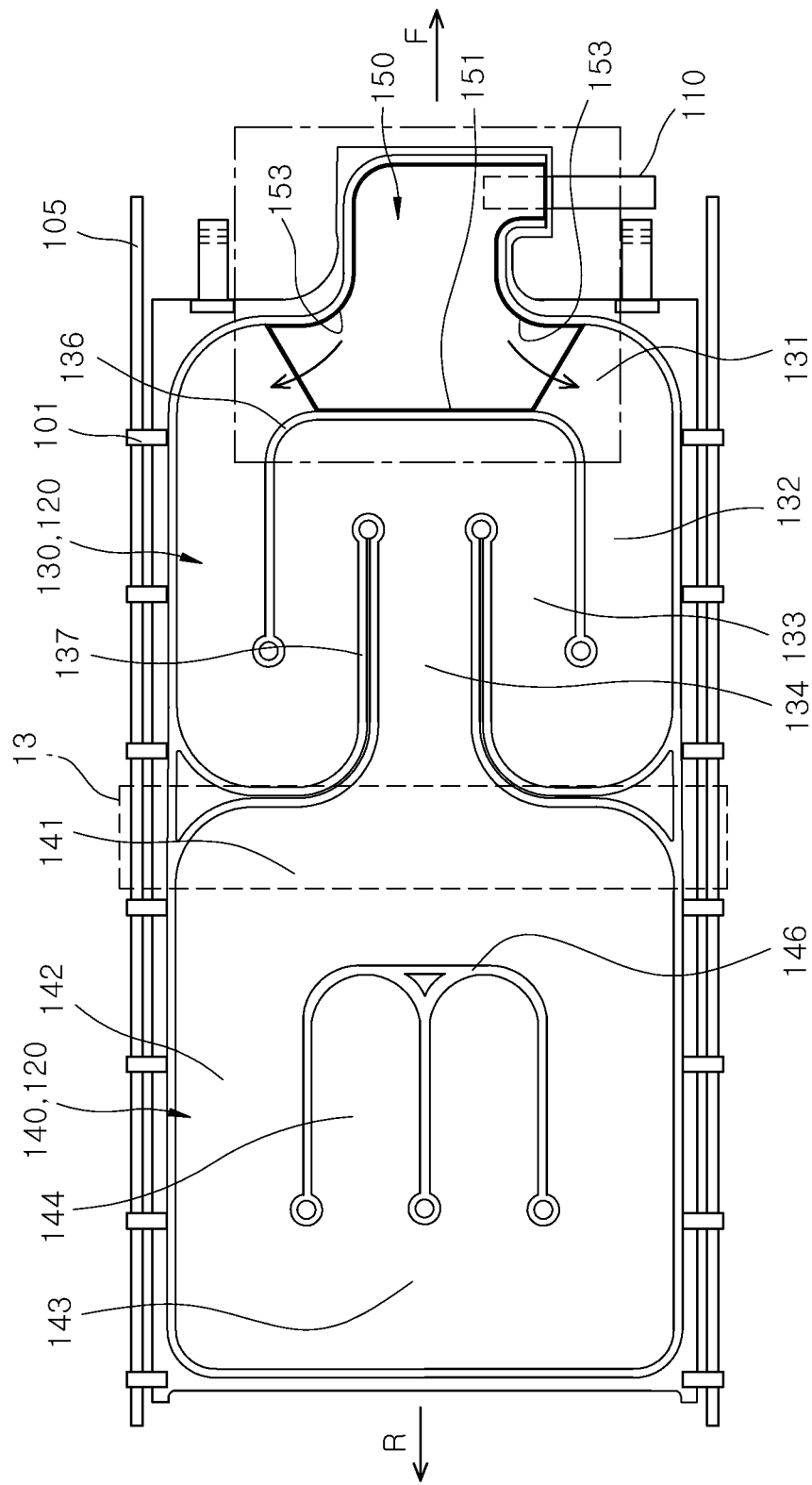
FIG. 3 is a plan view illustrating a state in which a roof airbag cushion of the roof airbag apparatus in accordance with the embodiment of the present disclosure is deployed.
Figure 4:
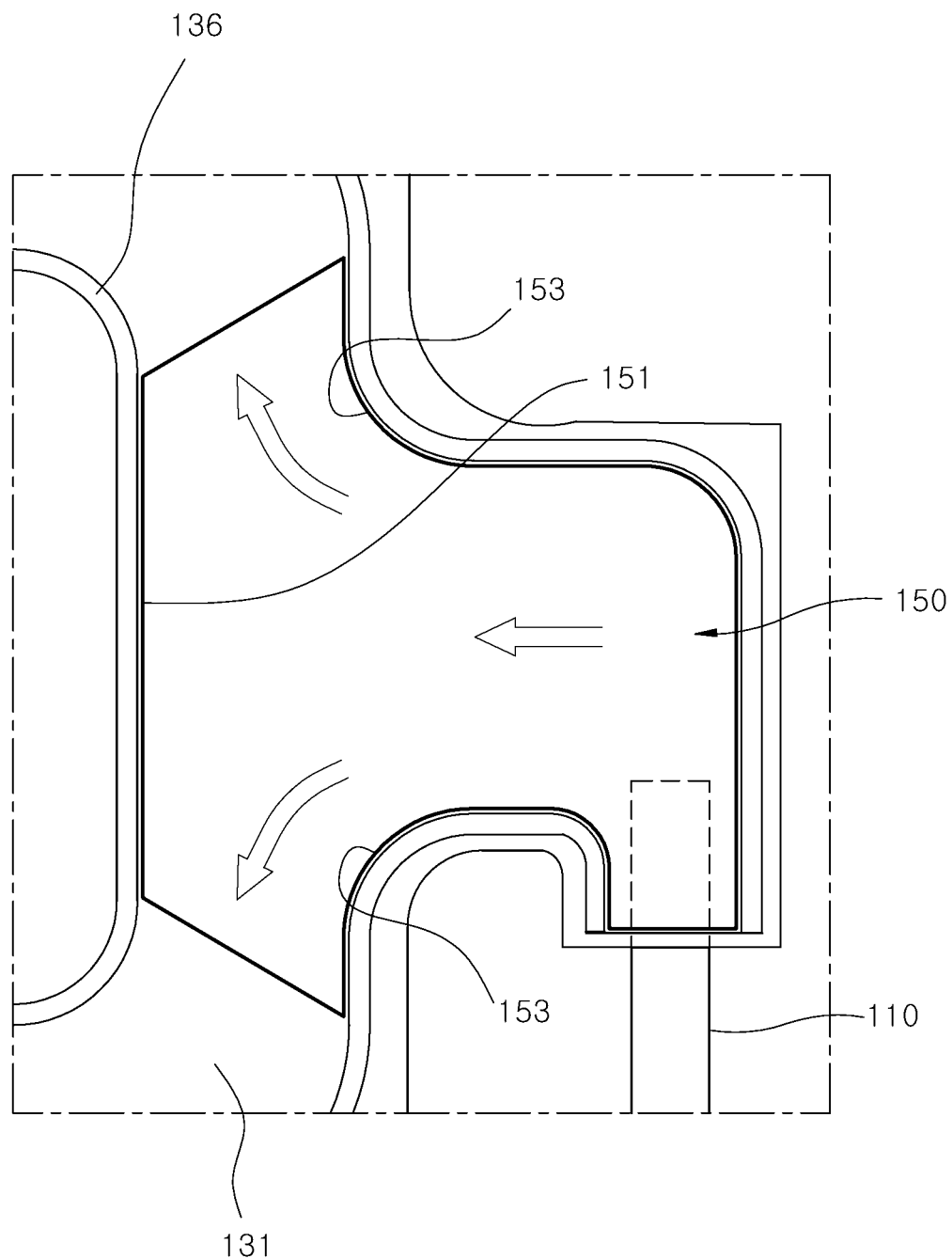
FIG. 4 is a plan view illustrating a diffuser in the roof airbag apparatus in accordance with the embodiment of the present disclosure.
Figure 5A:
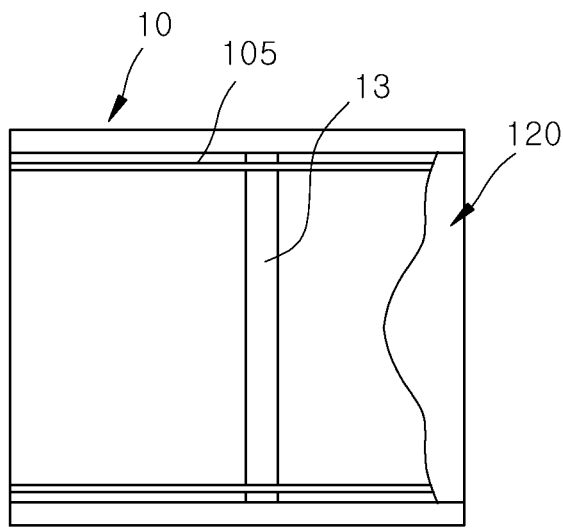
FIG. 5A, FIG. 5B, FIG. 5C, FIG. 5D, FIG. 5E, and FIG. 5F are deployment views illustrating a process in which the roof airbag cushion is deployed in the roof airbag apparatus in accordance with the embodiment of the present disclosure.
Figure 5B:
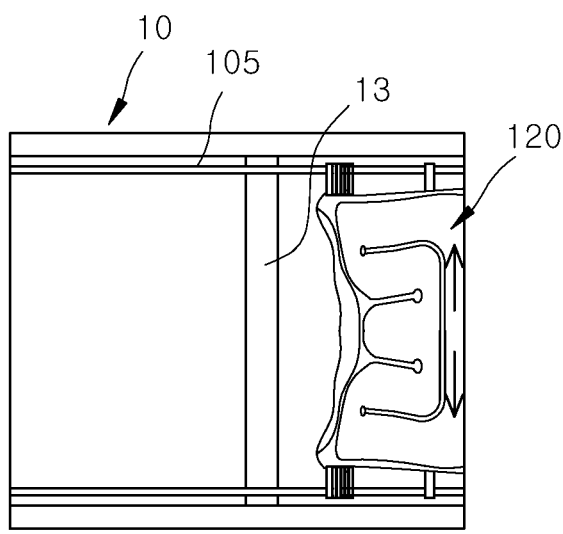
Figure 5C:
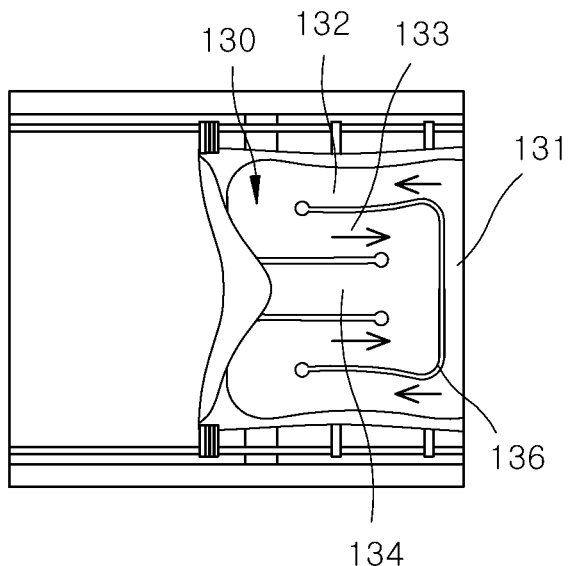
Figure 5D:
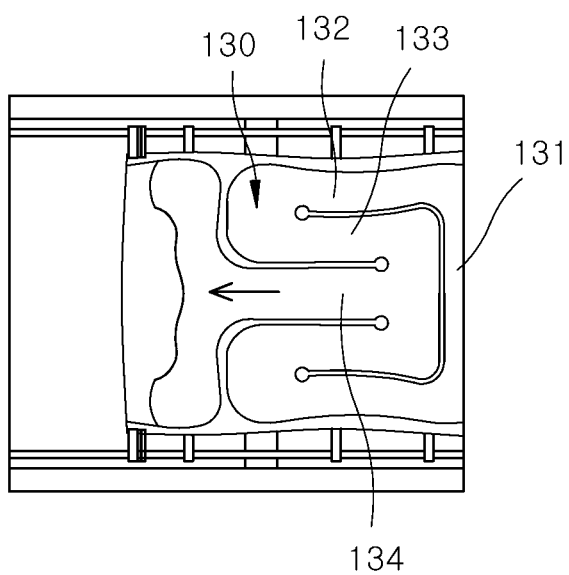
Figure 5E:
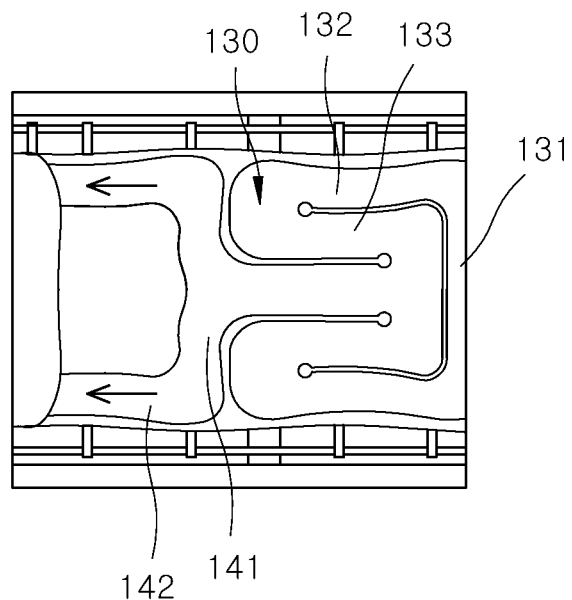
Figure 5F:
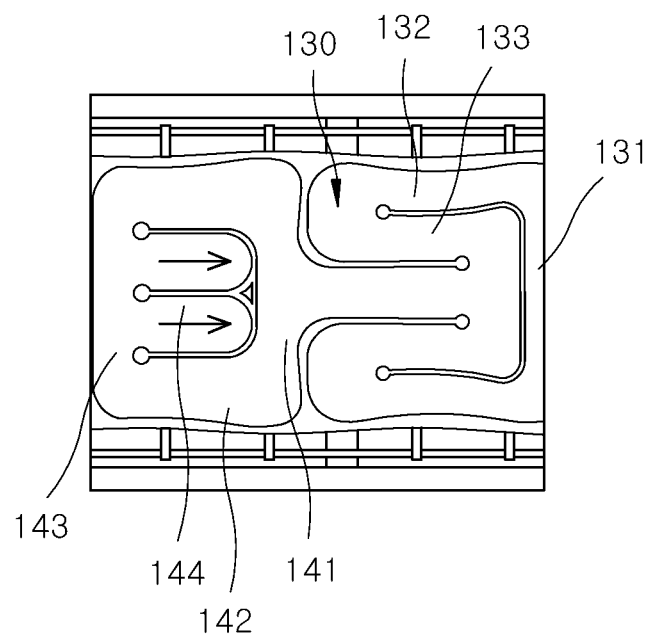

FIG. 1 is a perspective view illustrating a state in which a roof airbag apparatus in accordance with an embodiment of the present disclosure is installed on a panorama roof, FIG. 2 is a perspective view illustrating the roof airbag apparatus in accordance with the embodiment of the present disclosure, FIG. 3 is a plan view illustrating a state in which a roof airbag cushion of the roof airbag apparatus in accordance with the embodiment of the present disclosure is deployed, and FIG. 4 is a plan view illustrating a diffuser in the roof airbag apparatus in accordance with the embodiment of the present disclosure.

Referring to FIGS. 1 to 4, the roof airbag apparatus in accordance with the embodiment of the present disclosure includes a roof airbag cushion 120 and a diffuser 150.

A panorama roof 10 is installed on the roof of a vehicle, and a center pillar 13 is installed to traverse the panorama roof 10 in a width direction. The roof airbag apparatus is installed on the panorama roof 10. An inflator 110 is installed at one end of the panorama roof 10. Guide parts 105 are installed along the front-rear direction of the vehicle on both sides of the panorama roof 10. As the guide parts 105, wires which are disposed parallel to each other on both sides of the center pillar 13 may be applied.

The roof airbag cushion 120 is connected to the inflator 110, and is disposed in a folded state at one end of the panorama roof 10. The roof airbag cushion 120 in the folded state is installed on one side of the center pillar 13 in a shape in which it is surrounded by a cover 120a.

The roof airbag cushion 120 is folded in a zigzag type, and the cover 120a is installed to surround the roof airbag cushion 120 in the folded state. The roof airbag cushion 120 is inflated by the gas supplied from the inflator 110.

A plurality of connection tabs 101 are installed on both sides of the roof airbag cushion 120. The plurality of connection tabs 101 are movably installed on the guide parts 105. In the case where the roof airbag cushion 120 is disposed in the folded state at one end of the panorama roof 10, the plurality of connection tabs 101 overlap in lines on the guide parts 105. In the case where the roof airbag cushion 120 is deployed, the connection tabs 101 support both sides of the roof airbag cushion 120 while moving along the guide parts 105. Detail descriptions will be made later for such a roof airbag cushion 120.

The diffuser 150 is disposed in the roof airbag cushion 120. The diffuser 150 includes a partition wall part 151 and a gas discharge part 153. The partition wall part 151 is formed at the center portion of the roof airbag cushion 120 to prevent gas from being inflated to the widthwise center portion of the roof airbag cushion 120. The gas discharge part 153 is connected with the partition wall part 151, and forms a flow path branched to both sides toward the guide parts 105 which are installed on both left and right sides. That is to say, the gas discharge part 153 is formed symmetrically on both sides with respect to the front-rear direction of the vehicle.

According to this fact, the diffuser 150 may deploy the roof airbag cushion 120 to both sides in the width direction of the vehicle. At an initial deployment stage of the roof airbag cushion 120, since the diffuser 150 injects gas not in a normal rear direction of the vehicle but in a direction substantially perpendicular to the normal rear direction, that is, injects gas left-right symmetrically toward the guide parts 105, both left and right sides of the roof airbag cushion 120 are deployed symmetrically. Therefore, because the roof airbag cushion 120 is prevented from being asymmetrically inflated and deployed, it is possible to prevent the roof airbag cushion 120 from being not deployed by being caught by the center pillar 13.

The gas discharge part 153 of the diffuser 150 is formed in an inclined shape where it extends toward the guide parts 105. Because the gas supplied into the roof airbag cushion 120 is smoothly changed in its flow direction along the gas discharge part 153 toward the guide parts 105, at an initial deployment stage of the roof airbag cushion 120, the roof airbag cushion 120 may be deployed by easily spreading to both sides in the width direction of the vehicle.

The roof airbag cushion 120 includes a leading deployment part 130 and a trailing deployment part 140. In the roof airbag cushion 120, the trailing deployment part 140 is deployed after the leading deployment part 130 is deployed. In the deployment of the leading deployment part 130, the leading end of the leading deployment part 130 may be disposed at a position corresponding to the center pillar 13.

The leading deployment part 130 includes a first chamber portion 131, a second chamber portion 132, a third chamber portion 133 and a fourth chamber portion 134.

The diffuser 150 is disposed in the first chamber portion 131. The first chamber portion 131 is deployed to both sides in the width direction of the panorama roof 10. In other words, the first chamber portion 131 is left-right symmetrically deployed not in the normal rear direction of the vehicle but in the direction substantially perpendicular to the normal rear direction, that is, toward the guide parts 105.

Since the first chamber portion 131 is deployed in parallel with the width direction of the panorama roof 10, at an initial deployment stage of the leading deployment part 103, the leading deployment part 130 may be deployed symmetrically in the width direction of the vehicle.

The second chamber portion 132 is connected with the first chamber portion 131, and is deployed from the first chamber portion 131 toward the rear of the vehicle. The second chamber portion 132 is deployed substantially perpendicularly to the first chamber portion 131, and forms the outermost portion of the roof airbag cushion 120. The connection tabs 101 are installed outside the second chamber portion 132. Since the second chamber portion 132 is deployed toward the rear of the vehicle, when the second chamber portion 132 is inflated and deployed, the second chamber portion 132 may be easily deployed along the guide parts 105. The deployment speeds of the left and right sides of the second chamber portion 132 which form the left and right ends of the loop airbag cushion 120 are the same or substantially the same.

The third chamber portion 133 is connected with the second chamber portion 132, and is deployed in a direction opposite to the deployment direction of the second chamber portion 132, that is, toward the front of the vehicle. The third chamber portion 133 is disposed inside the second chamber portion 132. While the flow direction of gas is changed from the second chamber portion 132 to the third chamber portion 133, the deployment of the leading deployment part 130 in the length direction thereof, that is, in the front-rear direction of the vehicle, is temporarily stopped.

The fourth chamber portion 134 is connected with the third chamber portion 133, and is deployed in a direction opposite to the deployment direction of the third chamber portion 133, that is, toward the rear of the vehicle. The fourth chamber portion 134 is disposed between a pair of portions of the third chamber portion 133. As the fourth chamber portion 134 is inflated and deployed, the widthwise center portion of the leading deployment part 130 is inflated.

The first chamber portion 131, the second chamber portion 132, the third chamber portion 133 and the fourth chamber portion 134 which form the leading deployment part 130 are sequentially inflated and deployed. The outer portion of the leading deployment part 130 is first deployed as the first chamber portion 131 and the second chamber portion 132 are inflated, and the inner portion of the leading deployment part 130 is then inflated as the third chamber portion 133 and the fourth chamber portion 134 are inflated.

While the flow direction of gas is oppositely changed from the second chamber portion 132 to the third chamber portion 133, the deployment of the leading deployment part 130 in the length direction thereof is temporarily stopped. Therefore, since the widthwise center portion of the leading deployment part 130 is inflated after the leading end of the leading deployment part 130 reaches the center pillar 13, the leading end of the leading deployment part 130 passes the center pillar 13 after it is inflated in parallel with the width direction of the leading deployment part 130. Therefore, it is possible to prevent the leading end of the leading deployment part 130 from being not deployed by being caught by the center pillar 13.

A first seam portion 136 which partitions the first chamber portion 131, the second chamber portion 132 and the third chamber portion 133 is formed in the roof airbag cushion 120. The first seam portion 136 is formed in the shape of "U." The center portion of the first seam portion 136 is disposed in parallel with the partition wall part 151, and both ends of the first seam portion 136 which extend by being bent from the center portion partition the second chamber portion 132 and the third chamber portion 133 as an inner portion and an outer portion in the width direction of the vehicle. Since the first seam portion 136 is disposed in parallel with the partition wall part 151, the gas discharged through the gas discharge part 153 deploys the first chamber portion 131 in the width direction of the vehicle.

Also, a pair of second seam portions 137 each of which has the shape of "L" are formed in the roof airbag cushion 120 such that the gas flow directions of the second chamber portion 132 and the third chamber portion 133 are opposite to each other. Therefore, while the flow direction of gas is changed to an opposite direction where the second chamber portion 132 and the third chamber portion 133 are connected with each other, the leading end of the leading deployment part 130 is not deployed in the length direction of the roof airbag cushion 120. Thus, it is possible to prevent the leading end of the leading deployment part 130 or the folded portion of the trailing deployment part 140 from being caught by the center pillar 13.

Hence, after deploying the second chamber portion 132, gas is changed in its flow direction and deploys the third chamber portion 133 which is disposed inside the second chamber portion 132. Namely, the flow direction of gas is changed to an opposite direction while gas flows from the second chamber portion 132 to the third chamber portion 133. While the flow direction of gas is changed oppositely where the second chamber portion 132 and the third chamber portion 133 are connected with each other, the leading end of the leading deployment part 130 is not deployed in the length direction of the roof airbag cushion 120.

The trailing deployment part 140 includes a fifth chamber portion 141, a sixth chamber portion 142, a seventh chamber portion 143 and an eighth chamber portion 144.

The fifth chamber portion 141 is connected with the fourth chamber portion 134, and is deployed to both sides in the width direction of the vehicle. By this fact, the fifth chamber portion 141 is disposed in parallel with the first chamber portion 131 of the leading deployment part 130.

The sixth chamber portion 142 is connected with the fifth chamber portion 141, and is deployed from the fifth chamber portion 141 toward the rear of the vehicle. The sixth chamber portion 142 is deployed substantially perpendicularly to the fifth chamber portion 141, and forms the outermost portion of the roof airbag cushion 120. The connection tabs 101 are installed outside the sixth chamber portion 142. Since the sixth chamber portion 142 is deployed toward the rear of the vehicle, when the sixth chamber portion 142 is inflated and deployed, the sixth chamber portion 142 may be easily deployed along the guide parts 105. The deployment speeds of the left and right sides of the sixth chamber portion 142 which form the left and right ends of the loop airbag cushion 120 are the same or substantially the same.

The seventh chamber portion 143 is connected with the sixth chamber portion 142, and is deployed in a direction opposite to the deployment direction of the fifth chamber portion 141. That is to say, if the fifth chamber portion 141 is deployed in a direction diverging outward, the seventh chamber portion 143 is deployed in a direction converging inward. After deployment, the seventh chamber portion 143 is disposed in parallel with the fifth chamber portion 141 and the first chamber portion 131.

The eighth chamber portion 144 is connected with the seventh chamber portion 143, and is deployed toward the front of the vehicle, and is disposed inside the sixth chamber portion 142. As the eighth chamber portion 144, a plurality of portions are branched from the seventh chamber portion 143 toward the front of the vehicle. The fifth chamber portion 141, the sixth chamber portion 142, the seventh chamber portion 143 and the seventh chamber portion 144 which form the trailing deployment part 140 are sequentially inflated and deployed.

A third seam portion 146 is formed in the trailing deployment part 140 to limit the inflation thickness of the trailing deployment part 140. Since the third seam portion 146 limits the inflation thickness of the trailing deployment part 140, as the third seam portion 146 reduces the gas accommodation amount of the roof airbag cushion 120, the roof airbag cushion 120 may be tightly inflated by gas. Meanwhile, in the case where the third seam portion 146 is not formed in the trailing deployment part 140, as the inflation thickness of the roof airbag cushion 120 is increased too much, the roof airbag cushion 120 is not inflated tightly.

The third seam portion 146 is formed in the shape of "E" to guide the gas discharge route of the fourth chamber portion 134 and partition the sixth chamber portion 142 and the eighth chamber portion 144. The eighth chamber portion 144 is divided into a plurality of regions by the third seam portion 146.

After the fifth chamber portion 141, the sixth chamber portion 142 and the seventh chamber portion 143 which are disposed at the periphery of the trailing deployment part 140 are deployed, the eighth chamber portion 144 which is disposed inside the trailing deployment part 140 is deployed. Therefore, since the eighth chamber portion 144 is deployed in the state in which the connection tabs 101 are moved along the guide parts 105 as the sixth chamber portion 142 is deployed, the trailing deployment part 140 may be smoothly deployed.

The deployment process of the roof airbag apparatus in accordance with the embodiment of the present disclosure, constructed as mentioned above, will be described below.

FIGS. 5A to 5F are deployment views illustrating a process in which the roof airbag cushion is deployed in the roof airbag apparatus in accordance with the embodiment of the present disclosure.

Referring to FIGS. 5A to 5F, in the case of a rollover or the like of the vehicle, if the inflator 110 is driven, the gas of the inflator 110 is introduced into the diffuser 150. As the gas of the diffuser 150 flows into the first chamber portion 131, the first chamber portion 131 is inflated and deployed in the width direction of the vehicle, that is, the panorama roof 10. Since the first seam portion 136 and the partition wall part 151 are disposed normally rearward of the vehicle, gas in the diffuser 150 is supplied along the gas discharge part 153, and also, the first chamber portion 131 is deployed in the width direction of the vehicle.

As the gas of the first chamber portion 131 flows into the second chamber portion 132, the second chamber portion 132 is inflated and deployed. As the second chamber portion 132 is deployed, the connection tabs 101 are moved along the guide parts 105. The second chamber portion 132 is deployed toward the rear of the vehicle.

While the flow direction of gas is changed oppositely where the second chamber portion 132 and the third chamber portion 133 are connected with each other, the leading end of the leading deployment part 130 is not deployed in the length direction of the roof airbag cushion 120. Then, the third chamber portion 133 and the fourth chamber portion 134 which are disposed inside the second chamber portion 132 are inflated, and thus, the trailing deployment part 140 is inflated after the leading end of the leading deployment part 130 is completely inflated. Thus, it is possible to prevent the leading end of the leading deployment part 130 or the folded portion of the trailing deployment part 140 from being caught by the center pillar 13.

As gas flows into the fifth chamber portion 141, the trailing deployment part 140 is deployed along the width direction of the vehicle. As gas flows into the sixth chamber portion 142, both sides of the trailing deployment part 140 are deployed in parallel with the guide parts 105. The seventh chamber portion 143 is inflated in parallel with the width direction of the vehicle but in a direction converging inward, after the sixth chamber portion 142 is deployed.

Since the eighth chamber portion 144 is inflated inside the trailing deployment part 140 after the fifth chamber portion 141, the sixth chamber portion 142 and the seventh chamber portion 143 which surround the periphery of the trailing deployment part 140 are deployed, both sides of the trailing deployment part 140 are symmetrically deployed.

As described above, at an initial deployment stage of the roof airbag cushion 120, since the diffuser 150 guides the injection route of the gas supplied from the inflator 110 such that the roof airbag cushion 120 is first deployed in the width direction of the vehicle, both left and right sides of the roof airbag cushion 120 may be deployed simultaneously and symmetrically. Therefore, because the roof airbag cushion 120 is prevented from being asymmetrically inflated and deployed, it is possible to prevent the roof airbag cushion 120 from being not deployed by being caught by the center pillar 13.

Further, when gas flows from the second chamber portion 132 to the third chamber portion 133, while the flow direction of gas is oppositely changed, the deployment of the leading deployment part 130 in the length direction thereof is temporarily stopped. Therefore, since the widthwise center portion of the leading deployment part 130 is inflated after the leading end of the leading deployment part 130 reaches the center pillar 13, it is possible to prevent the leading end of the leading deployment part 130 from being not deployed by being caught by the center pillar 13.

Furthermore, since the third seam portion 146 limits the inflation thickness of the trailing deployment part 140, the third seam portion 146 may reduce the gas accommodation amount of the roof airbag cushion 120. Accordingly, the roof airbag cushion 120 may be tightly inflated by gas.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A roof airbag apparatus, comprising:
   a roof airbag cushion disposed in a folded state in a panorama roof and configured to inflate and deploy as gas is supplied from an inflator; and
   a diffuser disposed in the roof airbag cushion and configured to guide a deployment of the roof airbag cushion in a width direction of a vehicle when the roof airbag cushion is inflated,
   wherein:
   the diffuser comprises:
      a partition wall part disposed on a rear side of the diffuser and configured to block gas supplied from the inflator from flowing to the rear side of the vehicle; and
      a gas discharge part connected with the partition wall part and configured to extend in the width direction of the vehicle and form flow paths of gas;
   the roof airbag cushion comprises:
      a leading deployment part having the diffuser disposed therein, and configured to inflate and deploy by gas supplied from the inflator; and
      a trailing deployment part connected with the leading deployment part and configured to inflate and deploy within a time interval from the leading deployment part; and
   the leading deployment part comprises:
      a first chamber portion having the diffuser disposed therein and configured to deploy in the width direction of the vehicle;
      a second chamber portion connected with the first chamber portion and configured to deploy from the first chamber portion toward the rear side of the vehicle;
      a third chamber portion connected with and disposed inside the second chamber portion and configured to deploy from the second chamber portion toward a front side of the vehicle; and
      a fourth chamber portion connected with and disposed inside the third chamber portion and configured to deploy from the third chamber portion toward the rear side of the vehicle.

2. The roof airbag apparatus according to claim 1, wherein the diffuser is formed such that the partition wall part and the gas discharge part define a "T" shape.

3. The roof airbag apparatus according to claim 1, wherein ends of the gas discharge part are formed in an inclined shape with respect to the partition wall part.

4. The roof airbag apparatus according to claim 1, wherein:
- a first seam portion partitions the first chamber portion, the second chamber portion, and the third chamber portion from one another, and
- the first seam portion is formed in the roof airbag cushion.

5. The roof airbag apparatus according to claim 4, wherein:
- the first seam portion is formed in a "U" shape,
- a center portion of the first seam portion is disposed in parallel with the partition wall part, and
- both ends are configured to extend by being bent from the center portion of the first seam portion partition, the second chamber portion, and the third chamber portion into an inside and an outside, in the width direction of the vehicle.

6. The roof airbag apparatus according to claim 4, wherein second seam portions are formed in the roof airbag cushion in such a manner that gas flows in a first direction in the second chamber portion and in a second direction in the third chamber portion, and wherein the first direction and second direction are opposite to each other.

7. The roof airbag apparatus according to claim 6, wherein:
- each of the second seam portions is formed in an "L" shape,
- first ends of the second seam portions are disposed in parallel with the width direction of the vehicle and configured to limit rearward deployment of the second chamber portion, and
- second ends of the second seam portions are disposed in parallel with a length direction of the vehicle and configured to guide forward deployment of the third chamber portion.

8. The roof airbag apparatus according to claim 1, wherein the trailing deployment part comprises:
- a fifth chamber portion connected with the fourth chamber portion and configured to deploy from the fourth chamber portion in the width direction of the vehicle;
- a sixth chamber portion connected with the fifth chamber portion and configured to deploy from the fifth chamber portion toward the rear side of the vehicle;
- a seventh chamber portion connected with the sixth chamber portion, configured to deploy from the sixth chamber portion in a direction opposite to a deployment direction of the fifth chamber portion, and disposed in parallel with the fifth chamber portion; and
- an eighth chamber portion connected with the seventh chamber portion, configured to deploy toward the front side of the vehicle, and disposed inside the sixth chamber portion.

9. The roof airbag apparatus according to claim 8, wherein the eighth chamber portion has a plurality of portions branching from the seventh chamber portion and configured to deploy toward the front side of the vehicle.

10. The roof airbag apparatus according to claim 8, wherein a third seam portion is formed in the trailing deployment part and configured to limit an inflation thickness of the trailing deployment part.

11. The roof airbag apparatus according to claim 10, wherein the third seam portion is formed in an "E" shape and configured to guide a gas discharge route of the fourth chamber portion and partition the sixth chamber portion and the eighth chamber portion.

\* \* \* \* \*